METHOD OF FORMING PRECISION LAMINATED ELECTRICAL COMPONENTS

Filed Dec. 26, 1967

INVENTOR
IVANHOE P. DENYSSEN

BY *Colton & Stone*

ATTORNEYS

United States Patent Office 3,558,396

Patented Jan. 26, 1971

3,558,396

METHOD OF FORMING PRECISION LAMINATED ELECTRICAL COMPONENTS

Ivanhoe P. Denyssen, 2000 Linwood Ave., Apt. 19R, Fort Lee, N.J. 07024

Filed Dec. 26, 1967, Ser. No. 693,545
Int. Cl. B32b *31/00*
U.S. Cl. 156—250 10 Claims

ABSTRACT OF THE DISCLOSURE

The disclosure relates to a method of forming precision laminated electrical components wherein a dry curable powder is dissolved in a volatile solvent and then applied as a coating on a sheet material blank. The volatile solvent is permitted to vaporize leaving a dry uncured surface coating on the blank after which time the blank is severed to produce a plurality of coated substrates or laminae that are stacked to produce an uncured laminated component which is subsequently cured.

BACKGROUND OF THE INVENTION

The invention relates to an improved method of precision forming laminated products. More particularly, the invention is directed to a method of producing laminated electrical components for miniature circuitry wherein very thin sheet metal laminae are uniformly spaced from one another and bonded together by extremely thin insulative layers. The method herein disclosed makes possible the lamination of small sheet metal lamina having a thickness on the order of less than four-thousandths of an inch which are separated from each other by uniform insulative coatings which may be as thin as a few millionths of an inch. The uniformity of the insulative layers, in accordance with the present invention, can be maintained within tolerances of about ±3%.

Transformers, solenoids, chokes, and other inductive components used in electronic circuits require high permeability metal cores to concentrate the electromagnetic flux to obtain high flux densities. Where inductive components are used with alternating or pulsating current sources, the metal core must be laminated and the individual metal plies or laminae separated from each other by insulation to reduce eddy current magnitude and attendant power loss in the form of heat dissipation.

In the case of large power applications it is not critical to keep the power losses to an absolute minimum and conventional insulative coatings such as paint or resin or an oxide coating may be applied to the metal plies before or after they are cut to shape after which time the plies are stacked and clamped to form the laminated components.

In conventional laminating procedures of the foregoing type for large power applications, a reasonable degree of non-uniformity may be tolerated without serious consequences; however, in the case of miniature circuitry where any power loss in circuit is extremely critical, it is essential to make the individual laminae as thin as possible and the uniformity of their spacing is critical to maintain these losses at a minimum.

In the case of laminated components made up of very thin laminae such as, for example, less than fixe-thousandths of an inch in thickness, it is desirable that the same be bonded firmly together. This not only prevents damage and/or relative movement in handling but insures that relative movement will not occur in service, i.e., when subjected to magnetizing currents. This latter factor is of great importance in insuring the reliability of the circuit in which the laminated component is used since any relative movement during the time a magnetizing current is applied will vary the properties of the component and affect the operation of the circuit.

Prior to this invention the formation of small laminated components from very thin laminae has been a laborious process and the desired uniformity of spacing between individual laminae virtually impossible to achieve. Conventional techniques for forming small laminated components involve stamping or punching the individual laminae, coating with a wet resin and manually stacking the same in a fixture prior to curing under pressure. In this process, excess resin oozes out of the laminated stack. The removal of this excess resin, after curing, is a laborious and time consuming task which adds substantially to the cost of fabricating these components.

SUMMARY OF THE INVENTION

It is a primary object of the invention to provide a method of forming a laminated article from very thin laminae that are uniformly spaced and bonded together.

Another important object of the invention is to provide a method of forming small laminated electrical components wherein the thickness of the insulative layers between metal laminae may be accurately controlled and uniformly applied.

Among the other objects achieved by the method of forming electrical components herein disclosed are the formation of a component that is reliable in operation; that may be produced in a manner susceptible of automation; that dispenses with the necessity of removing excess insulation from the laminated component; that may be unit-handled prior to curing; and that may be expeditiously severed from a larger laminated stack prior to curing.

The foregoing and other advantages are made possible by precision coating the metal laminae making up the laminated component with a dry uncured insulative material prior to the laminating and curing operations.

In recent years a number of new epoxy resins that are dry and granular have become available. Upon mixing such a resin with a powder type latent hardener and accelerator, a stable mixture results that will not cure until heat is applied to activate the hardener. It has been found that upon dissolving this mixture in a volatile solvent, such as acetone, it may be applied to metals or other materials and will dry like a varnish to produce a fairly hard uncured surface coating. An important corollary to this observation is the recognition that the thickness of such a dried coating is a function of the percentage solids dissolved in a given amount of solvent, determined on a weight basis. Thus, it is possible to produce absolutely uniform coatings continuously on a strip of metal by any of a variety of coating processes such as dip coating. The coatings may be made a few millionths or several thousandths of an inch thick, depending only upon the ratio of solids to solvent, by weight.

After vaporization of the volatile material, the dry coating is sufficiently strong to remain substantially undisturbed as thin parts are punched or otherwise severed from the strip of metal so coated. In the case of a punching operation, an appropriately configured magazine may be positioned to receive the severed coated laminae so that a stack of such laminae is built up as the punching operation proceeds. In building up a stack in this manner it is desirable that the laminae adhere together to facilitate unit-handling and positioning of the stack to subdivide the same into smaller stacks of a desired thickness prior to the curing operation. For example, an expeditious manner of forming a plurality of laminated components consisting of, say, thirty stacked laminae would involve the formation of a large stack within the magazine after which time this large unit-handled stack may be subdivided by slicing, as with a knife, into smaller stacks containing thirty laminae, each.

If punch pressure be accurately controlled, a slight amount of heat is momentarily applied to the coating during the punching operation due to the punch pressure required to shear the laminae. This momentary heat input is sufficient to soften the coating on the laminae slightly and render the same tacky so that the laminae within the magazine will adhere together to produce a unit-handled uncured laminated stack. Magazine stacking and initial adherence of the laminae, as described, results in a columnar stack wherein the laminae are far more accurately aligned than is possible in a manual operation.

This precise registration coupled with the uniform insulative spacings and unit-handling feature facilitates slicing the stack into smaller laminated components containing any desired number of laminae either manually or automatically. Thus, because of the precise spacing between laminae, the slicing operation is readily adaptable to automation merely by providing a slicing knife that may be accurately positioned in parallel relation to a guide against which one end of the stack abuts.

The laminated stacks are then cured under heat and pressure to form the most precise laminated electrical component having the most uniform electromagnetic properties, from stack to stack, that has been known prior to the time of the present invention. The production of such precision components are made possible because the coating thickness may be controlled and kept to a uniform thickness within tolerances of about $\pm 3\%$.

Inasmuch as the resin coating is dry during the curing operation, it will soften slightly to firmly adhere to the coating on adjacent laminae but will not run or ooze out of the stack.

DESCRIPTION OF THE DRAWING

The manner in which precision laminated miniature circuit components such as laminated cores and the like may be produced in accordance with the present invention will become more apparent from the following detailed description considered in conjunction with the drawing wherein.

DESCRIPTION OF THE PREFERRED EMBODIMENT

Figures 1, 2:
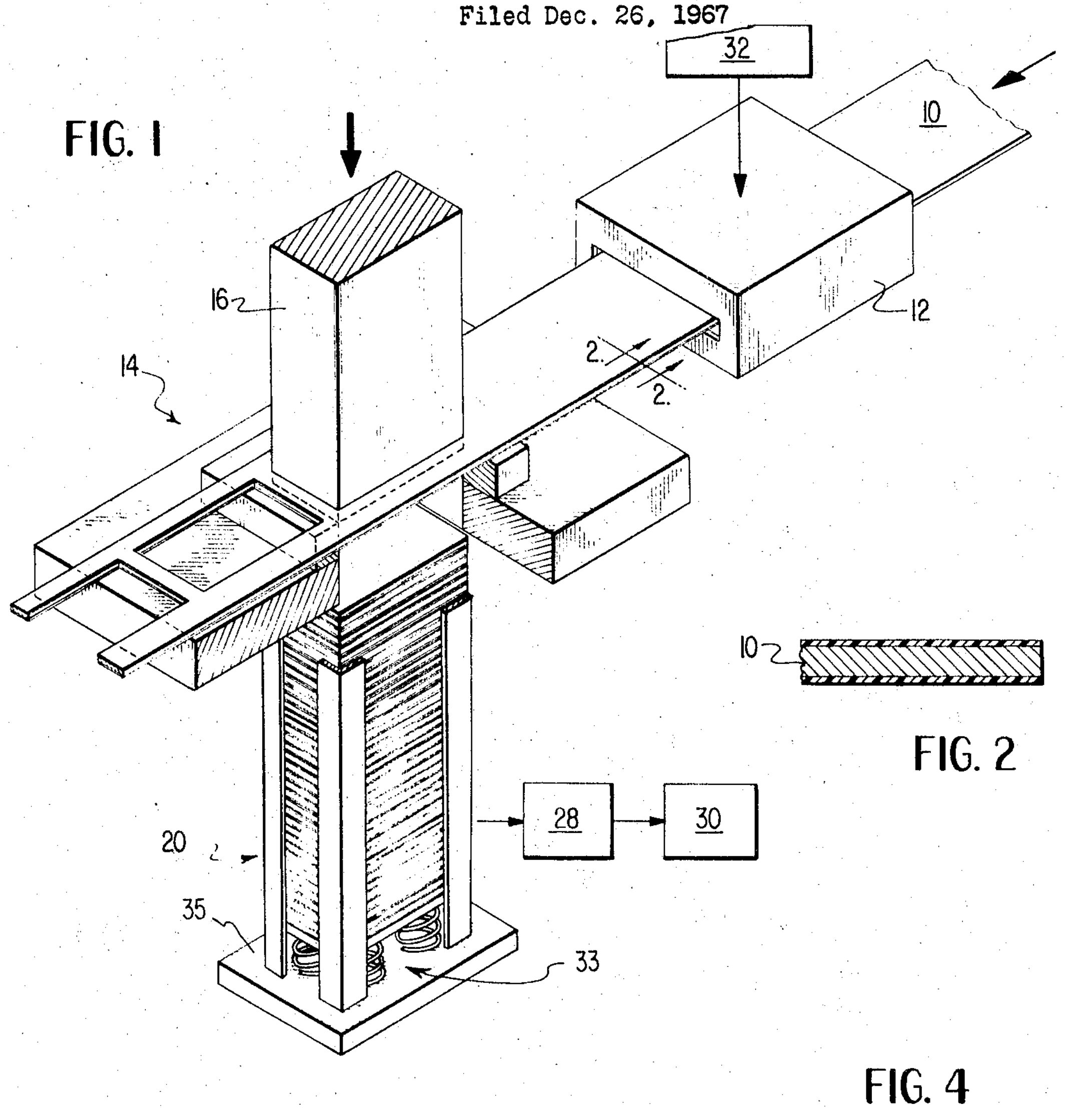
FIG. 1 is a generally schematic representation of the steps involved in the formation of a laminated electrical component in accordance with the invention.
FIG. 2 is a greatly enlarged fragmentary cross-sectional view taken along the line 2—2 of FIG. 1.
Figure 4:
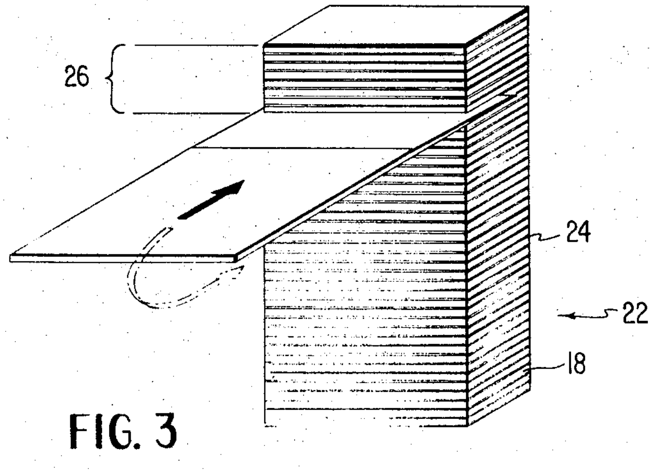
FIG. 4 is a perspective view of the finished component.

FIG. 1 is a somewhat schematic depiction of the steps involved in the formation of a laminated component according to the invention. A strip or blank of sheet metal 10 drawn from a supply roll, not shown, passes through a coating and drying station 12 to a punching station 14 where punch 16 severs laminae 18 from the strip and directs the same into magazine 20. The punched sheet metal strip leaving the punching station may be wound on a takeup roll, not shown. The laminated stack 22 consisting of laminae 18 and intervening coating material 24 may then be subdivided into smaller stacks 26 at a slicing station 28 prior to being cured at curing station 30 to produce a finished component, such as shown in FIG. 4.

A dry, granular epoxy resin such as Epon resin No. 1001 or 1002, made by Shell Chemical Company, is mixed with a powdered curing agent and accelerator such as dicyandiamide and benzyl dimethylamine, respectively, and this mixture is dissolved in acetone in the appropriate weight ratio to produce the desired thickness of coating 24. The acetone solution thus formed is transferred from mixing station 32 to coating and drying station 12 where the same is applied to metal strip 10 by a dip coating process after which time the acetone is vaporized and strip 10 emerges from station 12 containing a fairly hard uncured surface coating of uniform thickness.

Figure 3:
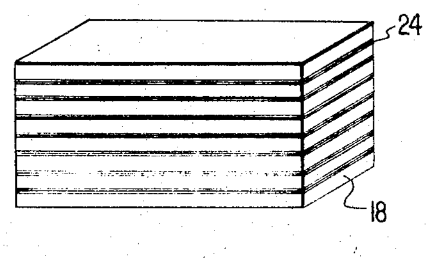
FIG. 3 is a schematic representation of the slicing operation.

The upper surface coating on each of the laminae undergoes momentary self-heating due to the punch pressure involved in shearing the material. The amount of heat thus generated is sufficient to render the coating tacky so that as each lamina is punched from the strip to fall into magazine 20, the coatings on adjacent laminae will adhere to produce the unit-handled uncured laminated stack 22. The upper end of the stack may be resiliently retained in position to be engaged by the punch at its lower stroke limit as by spring biasing means 33 reacting between a suitable support 35 and a pressure plate engaging the lower end of the stack. The compressive forces thus applied to the upwardly biased stack by the punch facilitates adherence of the laminae and insures that adjacent laminae are pressed together while the coating is tacky. Stack 22 may be manually removed from the magazine and stacks containing desired numbers of laminae may be sliced therefrom, either manually or by machine, by means of a slicing knife inserted between adjacent laminae as illustrated in FIG. 3. Following the application of heat and pressure to these stacks at curing station 30, a laminated component such as shown in FIG. 4 is produced which shows no seepage of resin from between the laminae because the same was dry prior to the curing operation. Additionally, the ability to accurately control coating thickness insures that no excess resin is present.

Although a drying station has been disclosed for vaporizing the solvent, it will be obvious that such station could consist of nothing more than a sufficiently long run to allow time for the solvent to vaporize under ambient conditions. The preferred curing conditions involve curing the dry coating fifteen minutes at 250° F. followed by curing for two hours at 350° F.

The laminated stacks produced in accordance with the method herein disclosed are strong and rigid and have a bond shear strength between the laminae or more than one thousand pounds per square inch. This makes it possible to machine finish any portions of the stack contour to a simple or intricate shape producing a finish just as though the stack were a solid piece of metal.

It is obvious that the process herein described and claimed has wide application, particularly for miniature parts. It also permits laminated parts to be made of metal far thinner than has been considered possible of practicable heretofore.

I claim:

1. A method of forming a precision laminated electrical component such as a core or the like, comprising; providing a dry uncured coating material on a plurality of metal laminae, forming a stack of said laminae and curing the stack while retaining said coating material within the peripheral confines of said stack.

2. The method of claim 1 including the step of subdividing said stack into a plurality of smaller stacks prior to curing the same.

3. The method of claim 1 wherein said dry uncured coating is provided by dissolving a dry curable mixture in a vaporizable liquid followed by vaporization of the liquid.

4. A method of forming a laminated stack, comprising; mixing a curable powder with a volatile solvent, coating a sheet material blank with said mixture, allowing said volatile solvent to vaporize leaving a dry uncured surface coating on the blank, severing the blank into a plurality of individual dry coated sheet material substrates, stacking a plurality of said individual dry coated substrates to form a dry stack, and curing the dry stack.

5. A method of forming a precision laminated electrical component such as a core or the like, comprising; dissolving a dry curable mixture in a vaporizable liquid and coating a sheet metal blank therewith, allowing the liquid to vaporize leaving an uncured surface coating on the blank, severing the blank into a plurality of coated metal laminae containing that surface coating to appear in the finished electrical component, stacking the laminae, and curing the stack.

6. A method of forming a precision laminated electrical component such as a core or the like, comprising; providing a dry uncured coating on a plurality of metal laminae, softening said uncured coating, forming a stack of said laminae and curing the stack.

7. The method of claim 6 including the step of subdividing said stack into a plurality of smaller stacks prior to curing the same.

8. The method of claim 7 wherein the first named stack is subdivided by a slicing operation.

9. A method of forming a precision laminated electrical component such as a core or the like, comprising; dissolving a dry curable mixture in a vaporizable liquid and coating a sheet metal blank therewith, allowing the liquid to vaporize leaving an uncured surface coating on the blank, severing the blank into a plurality of coated metal laminae, softening the coating, stacking the laminae, and curing the stack.

10. The method of claim 9 including the step of subdividing the stack into a plurality of stacks prior to curing the same.

References Cited

UNITED STATES PATENTS

| | | | |
|---|---|---|---|
| 2,280,981 | 4/1942 | Schuh | 336—219 |
| 2,983,640 | 5/1961 | Knoll et al. | 156—264X |
| 3,029,403 | 4/1962 | Krueger | 29—609 |

VERLIN R. PENDEGRASS, Primary Examiner